(12) United States Patent
Login et al.

(10) Patent No.: US 9,061,204 B2
(45) Date of Patent: *Jun. 23, 2015

(54) INTERACTIVE GAME FOR AN ELECTRONIC DEVICE

(71) Applicant: OUT FIT 7 LIMITED, Limassol (CY)

(72) Inventors: Samo Login, Pissouri (CY); Rok Zorko, Ljubljana (SI)

(73) Assignee: OUTFIT7 LIMITED (CY)

( * ) Notice: Subject to any disclaimer, the term of this patent is extended or adjusted under 35 U.S.C. 154(b) by 189 days.

This patent is subject to a terminal disclaimer.

(21) Appl. No.: 13/720,121

(22) Filed: Dec. 19, 2012

(65) Prior Publication Data
US 2013/0109474 A1    May 2, 2013

Related U.S. Application Data

(63) Continuation of application No. 13/364,812, filed on Feb. 2, 2012, now Pat. No. 8,360,881.

(60) Provisional application No. 61/438,894, filed on Feb. 2, 2011.

(51) Int. Cl.
*A63F 13/219*   (2014.01)
*A63F 13/40*   (2014.01)

(52) U.S. Cl.
CPC ............ *A63F 13/04* (2013.01); *A63F 13/10* (2013.01); *A63F 2300/1075* (2013.01); *A63F 2300/204* (2013.01); *A63F 2300/303* (2013.01); *A63F 2300/638* (2013.01); *A63F 2300/8047* (2013.01)

(58) Field of Classification Search
USPC .................. 463/31, 36–43; 273/192; 434/365
See application file for complete search history.

(56) References Cited

U.S. PATENT DOCUMENTS

| | | | |
|---|---|---|---|
| 6,663,491 B2 * | 12/2003 | Watabe et al. .................. | 463/36 |
| 7,843,455 B2 * | 11/2010 | Bridger et al. ................. | 345/473 |
| 2004/0005924 A1 * | 1/2004 | Watabe et al. .................. | 463/36 |
| 2010/0144434 A1 * | 6/2010 | Leingang et al. ............... | 463/35 |
| 2010/0240428 A1 * | 9/2010 | Mori ................................. | 463/3 |
| 2011/0111846 A1 * | 5/2011 | Ciarrocchi ...................... | 463/30 |
| 2012/0149001 A1 * | 6/2012 | Dohring et al. ............... | 434/365 |

* cited by examiner

*Primary Examiner* — Masud Ahmed
(74) *Attorney, Agent, or Firm* — Sheridan Ross PC; Stanley J. Gradisar

(57) ABSTRACT

An interactive game allows a player to play a "handclapping" game on a device with a touch screen interface (mobile phone, tablet or other such device) with a 3D model or a 2D model of an animal, a person, or any other character. The player must successfully mimic the moves of the 3D or 2D model/character to progress in the game. Specifically the player must match his moves by touching the screen with his finger or fingers with the moves made by the animal, a person, or any other character, which is also touching its appendages to specific areas of the touch screen.

23 Claims, 5 Drawing Sheets

INTERACTIVE GAME FOR AN ELECTRONIC DEVICE

CROSS-REFERENCES TO RELATED APPLICATIONS

This application is a continuation of U.S. patent application Ser. No. 13/364,812 titled "INTERACTIVE GAME FOR AN ELECTRONIC DEVICE" and having a filing date of Feb. 2, 2012, which claims the benefit of U.S. Provisional Application Ser. No. 61/438,894 filed on Feb. 2, 2011 titled "METHOD AND SYSTEM FOR AN INTERACTIVE GAME ON A MOBILE DEVICE" both of which are incorporated herein by reference in their entirety for all that is taught and disclosed therein.

BACKGROUND

This application relates to interactive games played on electronic devices having touch screen user interfaces.

SUMMARY

This Summary is provided to introduce in a simplified form a selection of concepts that are further described below in the Detailed Description. This Summary is not intended to identify key features or essential features of the claimed subject matter, nor is it intended to be used to limit the scope of the claimed subject matter.

The present system allows a player or user to play a "handclapping" game on a device with a touch screen interface (mobile phone, tablet, computer, laptop, or other such device with a touch screen interface) with a 3D model or a 2D model of an animal, a person, or any other character. The player must successfully mimic the moves of the 3D or 2D model/character, which in one embodiment shown in the figures is a 3D image of a giraffe, to progress in the game. Specifically the player must match his moves by touching the screen with his finger or fingers with the moves made by the giraffe, which is also touching its hooves to specific areas of the screen.

DETAILED DESCRIPTION

Figure 1:
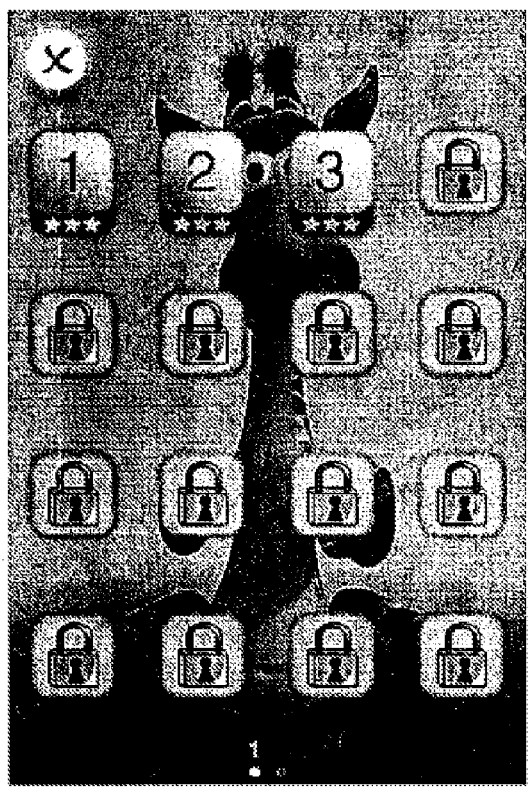
FIG. 1 shows a screen capture from a mobile device displaying a level picker screen in an embodiment.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

With the computing environment in mind, embodiments of the present invention are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Referring to the Figures, like reference numerals and names refer to structurally and/or functionally similar elements thereof, and if objects depicted in the figures that are covered by another object, as well as the tag line for the element number thereto, may be shown in dashed lines.

Game Play

FIG. 1 shows a screen capture from a mobile device displaying a level picker screen. Referring now to FIG. 1, the game is divided into multiple levels, where each level has its own choreography of "handclapping" moves that the giraffe is making When starting the game, the player must first choose the level on the level picker screen by touching the level's icon with his finger. The level picker screen contains a list of levels arranged in a grid. There are 16 levels on the first screen, with additional screens of 16 levels available by swiping the screen to the left. The programming for the game may be accomplished with any of the programming languages and software developer kits commonly utilized for applications designed to be downloaded as applications on smart phones, such as the Apple iPhone®and Android®phones, as well as other devices.

Figure 2:
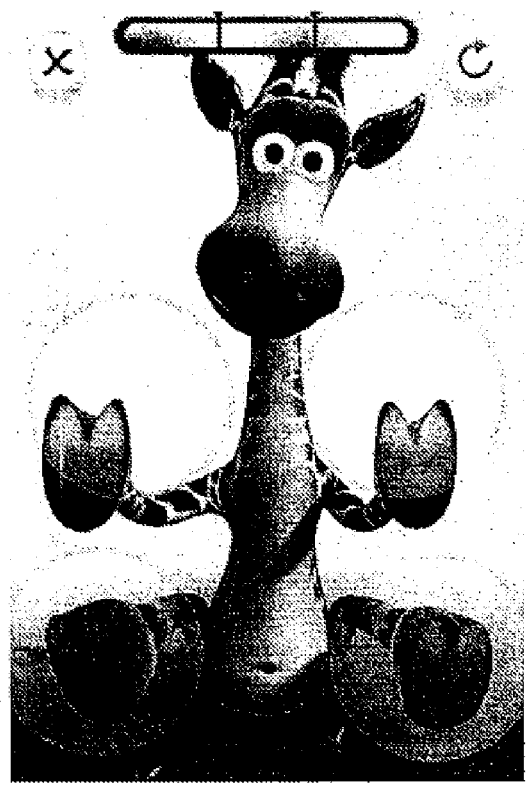
FIG. 2 shows a screen capture from a mobile device displaying a game play screen in an embodiment.

FIG. 2 shows a screen capture from a mobile device displaying a game play screen. Referring now to FIG. 2, in the beginning of the game only the first level is unlocked and accessible for game play. This is indicated by the fact that the first level's icon is different from all other level icons. The first level icon has a number (1) and three empty stars below, indicating that the level is unlocked but has not been completed at any speed. Levels 2 and 3 are also shown unlocked in FIG. 2. The other levels are locked, a fact that is indicated by a lock icon. When the player presses/touches the unlocked first level, the game play screen (FIG. 2) opens and the giraffe starts its choreography of moves. Each level of the game has three speeds: slow, medium, and high. When beginning a new level, the choreography of moves and the music speed are the lowest, i.e., slow.

The giraffe plays the "handclapping" game with its hooves by virtually touching the screen with one or more hooves, while the player must touch the screen from the user interface side with his finger or fingers at the exact same time and in the same area of the screen, providing touch screen input from the player. The area the player should touch is indicated by a circle around the giraffe's hoof/hooves as shown in FIG. 2.

The player touches the screen only on areas that the giraffe is touching with its hooves. When a touch is made by the giraffe, that area of the screen is marked by a white translucent circle with a pink edge. The player must touch the screen with his finger or fingers during that time. If the player is successful, the white translucent circle with the pink edge changes color to green, thereby indicating success. If the player touches that area too soon, the area changes color to a red circle. If the player touches the area too late or not at all, the area also changes color to a red circle. If the player misses the circle area that the giraffe is touching by its hoof or hooves, the entire game play screen flashes with red color.

The choreography of moves for a particular level is accompanied by music, where some beats indicate moves/touches that are made by the giraffe. In this way the music helps the player to intuitively anticipate moves before they are actually made.

There is also a progress bar in the top center part of the game play screen as shown in FIG. 2. The progress bar is divided into three equal parts, one for slow speed, one for medium speed and one for high speed. The progress bar is empty in the beginning, if that level has not been completed at any speed or if the player replays a completed level on low speed. As the music and choreography progress with time, the progress bar gets filled with green color as long as all the moves are successfully made. If the player makes a mistake or doesn't touch the screen at all, the progress bar switches color to red and gets filled with red color until the music and the choreography stop.

When the progress bar becomes red, indicating that the level will not be successfully completed, a pulsating restart button appears in the top right part of the screen right next to the progress bar. A stop or cancel button appears in the top left part of the screen right next to the progress bar. If the player presses the restart button, the level starts again at the same speed. If the player presses the stop or cancel button, the game ends.

When a particular choreography of moves ends, the music also stops. If the player has successfully touched the right parts of the screen at the right time, he/she has completed the level.

If the player successfully completes the level at the lowest speed, a screen appears (not shown) where three baby giraffes give him a one star rating. After that, the screen changes from the game play screen (FIG. 2) to the level picker screen (FIG. 1). The level that was just completed now has a one star rating, indicated by one yellow star and two empty stars in the level's icon. The next available level is unlocked, a fact that is indicated by an animation (not shown), the locked level icon turns around and becomes an unlocked level icon with no rating (three empty stars).

If the player fails the level, a screen appears (not shown) where the giraffe is sad indicating that the player was not successful. Two buttons are available on this screen, the replay button in the top right of the screen and the back button in the top left of the screen (not shown). The restart button restarts the level at the same speed. The back button switches the game play screen (FIG. 2) to the level picker screen (FIG. 1).

The player can start the level at medium speed only if the slow speed was successfully completed. Similarly, the player can only start the level at high speed if the medium speed was completed.

To start the level at medium or high speed the player must press the level icon. A menu (speed menu) appears with three choices: one star for slow speed, two stars for medium speed and three stars for high speed (not shown). If the player presses one star, the game play screen appears and the level begins at low speed. If the player presses two stars the level begins at medium speed and if the player presses three stars, the level begins at high speed.

If only the slow speed was completed for a level, the speed menu of that level has two active choices: slow and medium (one and two stars), the third choice is visible but not active, a fact which is indicated by three empty stars. The active choices are one yellow colored star and two yellow colored stars for slow and medium speed, respectively. If slow and medium speed were completed for a level, the speed menu has three active choices, and the player can therefore choose to play that level at any speed.

Possible Moves of the Giraffe

Figures 3A, 3B, 3C:
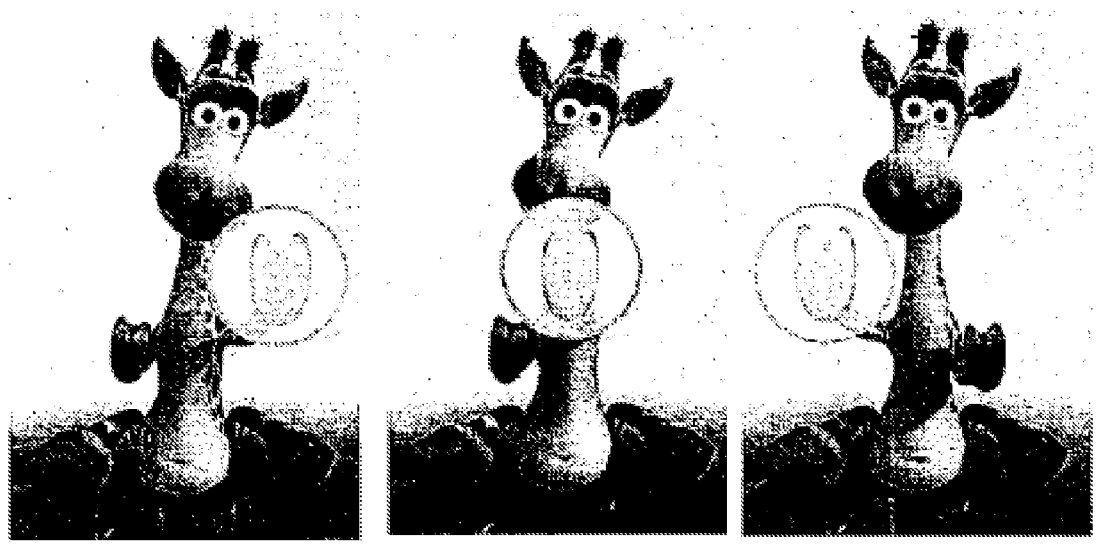
FIGS. 3A-3Q show screen captures from a mobile device displaying seventeen active moves in an embodiment.
Figures 3D, 3E, 3F:
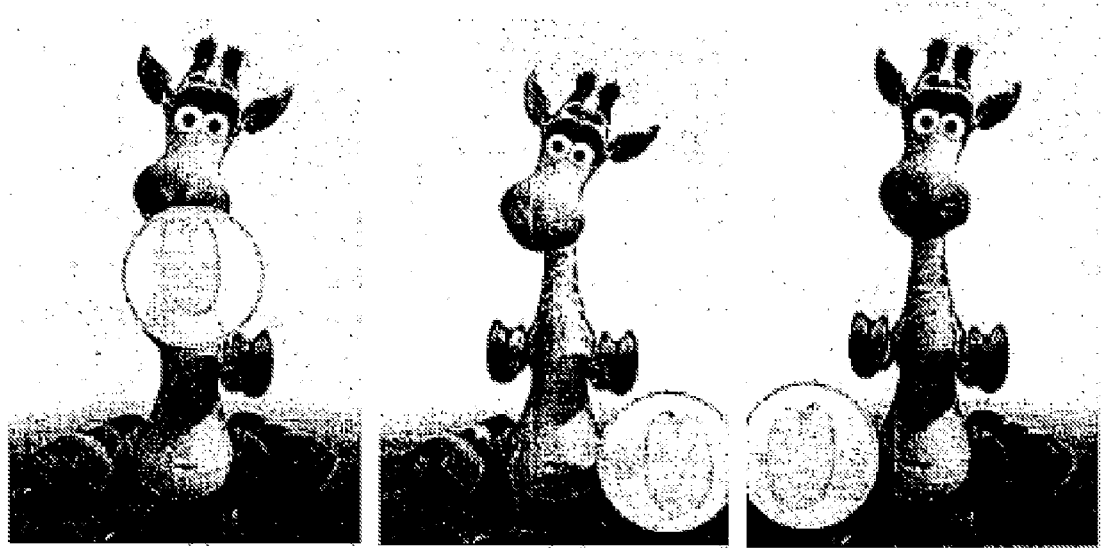
Figures 3G, 3H, 3I:
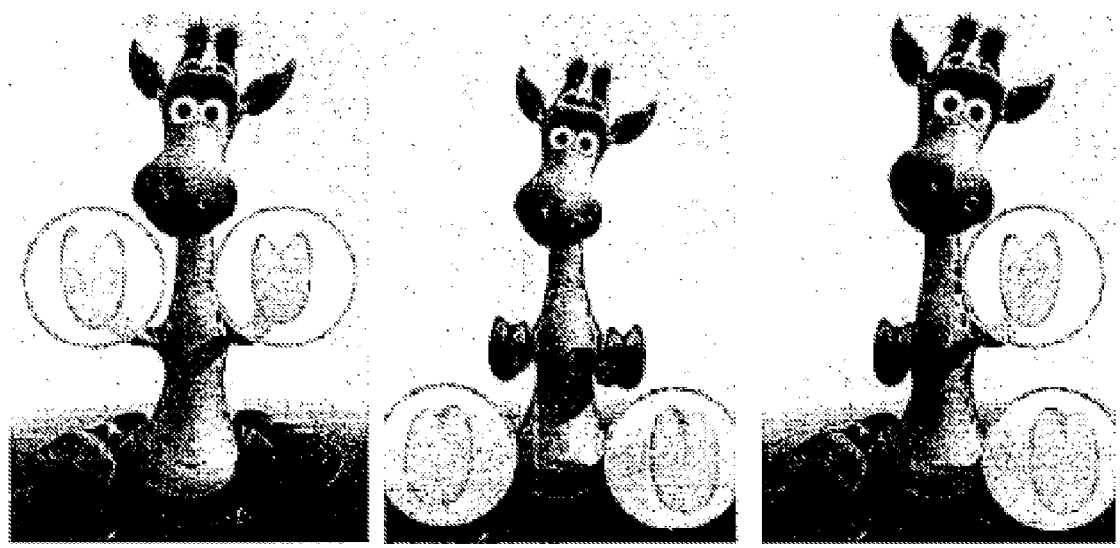
Figures 3J, 3K, 3L:
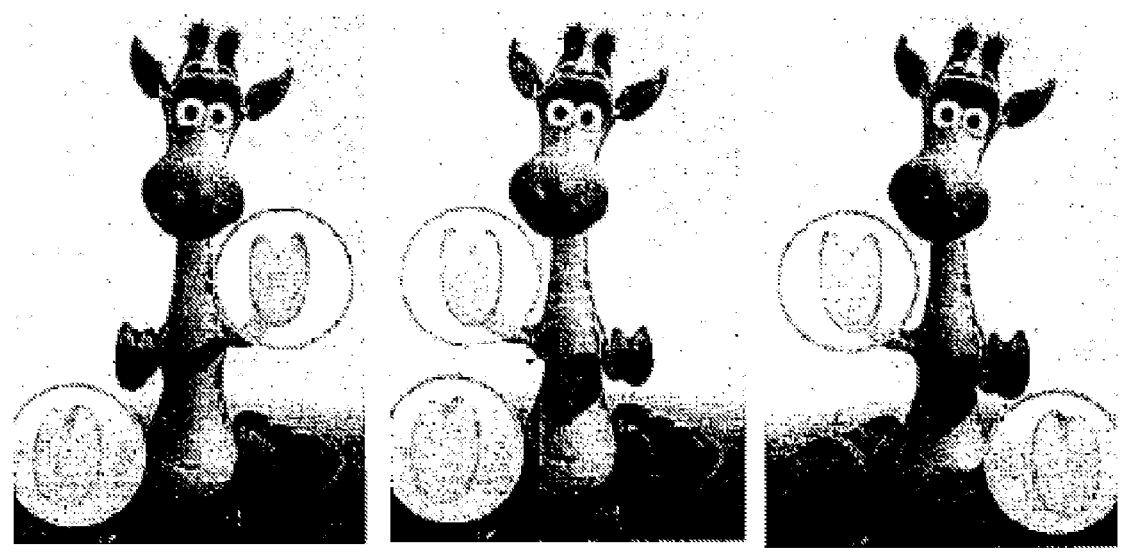
Figures 3M, 3N, 3O:
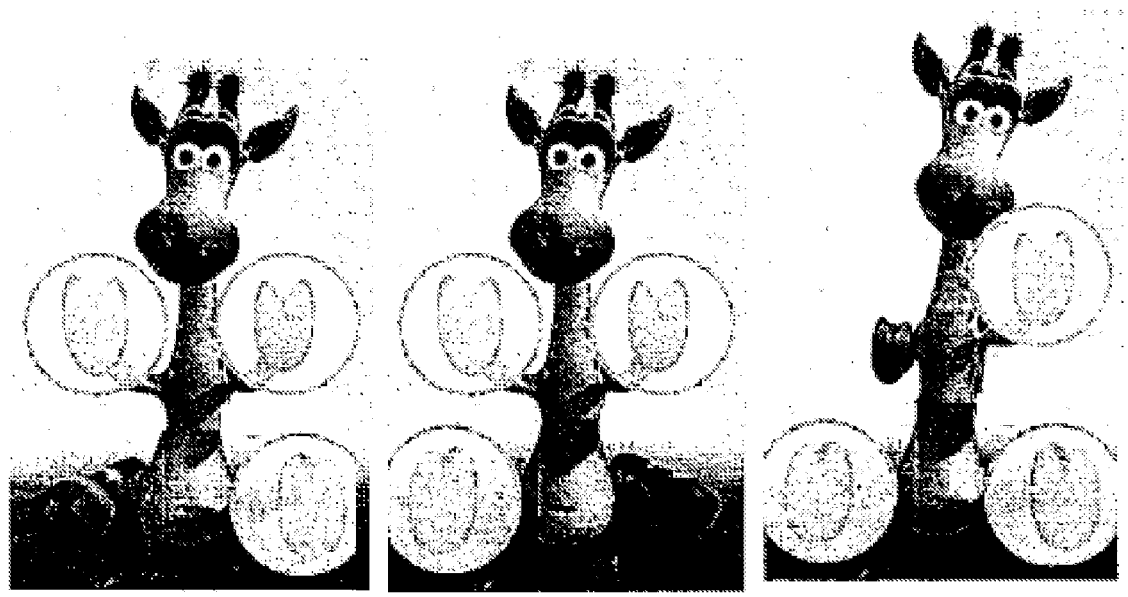
Figures 3P, 3Q:
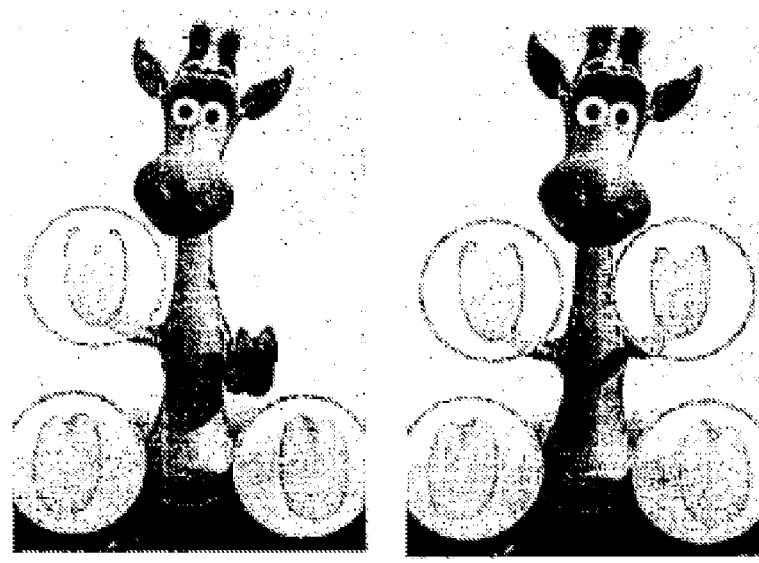
Figures 4A, 4B, 4C:
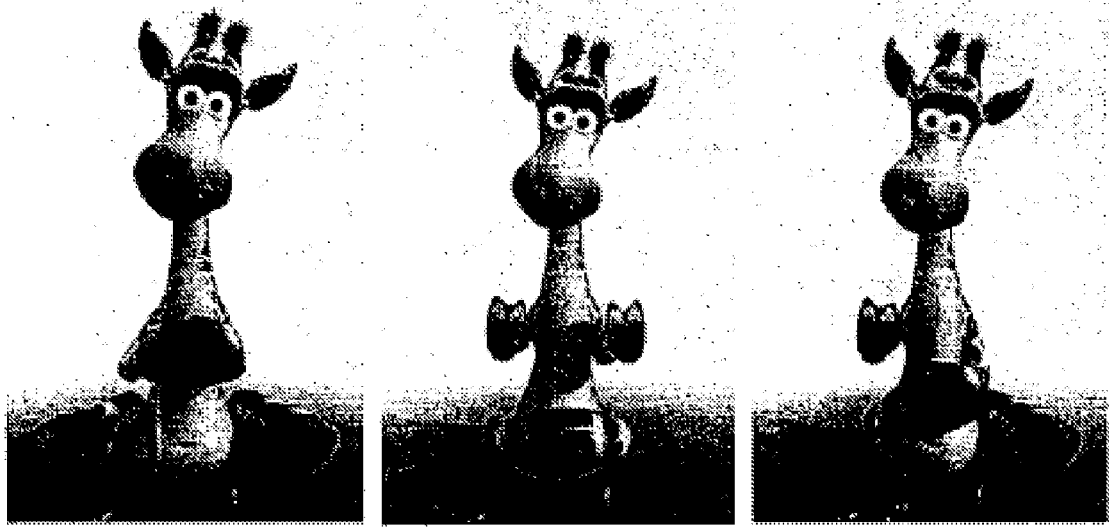
FIGS. 4A-4D show screen captures from a mobile device displaying four passive moves in an embodiment.
Figure 4D:

The giraffe can make twenty-one possible moves in the game. Seventeen moves are referred to as active moves: the giraffe touches the screen with one or more hooves, and the user is supposed to mimic those moves by touching the touch screen. FIGS. 3A-3Q are screen captures from a mobile device displaying these active moves which require the player to touch the touch screen in response. Some moves are referred to as passive moves: the giraffe touches its hooves together but does not touch the screen, and in response the user is not supposed to touch the touch screen. FIGS. 4A-4D are screen captures from a mobile device displaying these passive moves that require the player to not touch the touch screen.

Active Moves

Left Hand: the giraffe touches the screen with the hoof on its left hand. See FIG. 3A.

Left Hand Middle: the giraffe touches the center of the screen with the hoof on its left hand. See FIG. 3B.

Right Hand: the giraffe touches the screen with the hoof on its right hand. See FIG. 3C.

Right Hand Middle: the giraffe touches the center of the screen with the hoof on its right hand. See FIG. 3D.

Left Foot: the giraffe touches the screen with the hoof on its left foot. See FIG. 3E.

Right Foot: the giraffe touches the screen with the hoof on its right foot. See FIG. 3F.

Both Hands: the giraffe touches the screen with the hooves of both hands. See FIG. 3G.

Both Feet: the giraffe touches the screen with the hooves of both feet. See FIG. 3H.

Left Hand And Left Foot: the giraffe touches the screen with the hooves of its left hand and its left foot. See FIG. 3I.

Left Hand And Right Foot: the giraffe touches the screen with the hooves of its left hand and its right foot. See FIG. 3J.

Right Hand And Right Foot: the giraffe touches the screen with the hooves of its right hand and its right foot. See FIG. 3K.

Right Hand And Left Foot: the giraffe touches the screen with the hooves of its right hand and its left foot. See FIG. 3L.

Both Hands And Left Foot: the giraffe touches the screen with the hooves of its both hands and its left foot. See FIG. 3M.

Both Hands And Right Foot: the giraffe touches the screen with the hooves of its both hands and its right foot. See FIG. 3N.

Both Feet And Left Hand: the giraffe touches the screen with the hooves of its both feet and its left hand. See FIG. 3O.

Both Feet And Right Hand: the giraffe touches the screen with the hooves of its both feet and its right hand. See FIG. 3P.

Both Hands And Both Feet: the giraffe touches the screen with the hooves of both its hands and both its feet. See FIG. 3Q.

Passive Moves

Both Hands Together: the giraffe touches the hooves of both its hands together. See FIG. 4A.

Both Feet Together: the giraffe touches the hooves of both its feet together. See FIG. 4B.

Left Hand And Right Foot Together: the giraffe touches the hooves of its left hand and its right foot together. See FIG. 4C.

Right Hand And Left Foot Together: the giraffe touches the hooves of its right hand and its left foot together. See FIG. 4D.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. A method for displaying an interactive game on an electronic device, the method comprising the steps of:
    (a) displaying a character on a touch screen interface of the electronic device;
    (b) displaying a move of the character to cause at least one appendage of the character to make a virtual touch at a location on the touch screen;
    (c) receiving a touch screen input on the touch screen;
    (d) determining if the touch screen input coincides with the location of the virtual touch of the appendage of the character on the touch screen; and
    (e) displaying a visual indication on the touch screen indicating success or failure of the touch screen input to coincide with the location of the virtual touch of the at least one appendage of the character on the touch screen.

2. The method for displaying an interactive game on an electronic device according to claim 1 wherein step (b) further comprises the step of:
    displaying on the touch screen a visually distinct circular area around the location on the touch screen of the virtual touch of the appendage of the character.

3. The method for displaying an interactive game on an electronic device according to claim 2 wherein step (b) further comprises the step of:
    displaying the visual indication on the touch screen indicating success by displaying the visually distinct circular area in a first color, and displaying the visual indication on the touch screen indicating failure by displaying the visually distinct circular area in a second color.

4. The method for displaying an interactive game on an electronic device according to claim 3 wherein step (b) further comprises the step of:
    displaying the visually distinct circular area as a white translucent circular area with a pink edge, displaying the first color as green, and displaying the second color as red.

5. The method for displaying an interactive game on an electronic device according to claim 3 further comprising the step of:
    displaying on an entirety of the touch screen the second color in a flashing manner when the touch screen input on the touch screen falls outside of the visually distinct circular area of the virtual touch of the appendage of the character on the touch screen.

6. The method for displaying an interactive game on an electronic device according to claim 3 wherein step (d) further comprises the step of:
    determining if the touch screen input coincides with the location of the virtual touch of the appendage of the character on the touch screen at the same time that the character makes the virtual touch at the location on the touch screen to determine success.

7. The method for displaying an interactive game on an electronic device according to claim 1 wherein step (b) further comprises the step of:
    displaying a choreography of moves that the character makes to make a plurality of virtual touches with a plurality of appendages at a plurality of locations on the touch screen, wherein the choreography of moves of the character emulates clapping.

8. The method for displaying an interactive game on an electronic device according to claim 7 wherein step (d) further comprises the step of:
    determining if a plurality of touch screen inputs coincide with the plurality of locations of the plurality of virtual touches of the plurality of appendages of the character on the touch screen.

9. The method for displaying an interactive game on an electronic device according to claim 7 further comprising the step of:
    accompanying the choreography of moves with music outputted from the electronic device, wherein the beat of the music coincides with the choreography of moves of the plurality of appendages of the character.

10. The method for displaying an interactive game on an electronic device according to claim 9 further comprising the step of:
    providing a plurality of levels of the interactive game for display on the electronic device, wherein each of the plurality of levels has a unique set of the choreography of moves, and further wherein each of the plurality of levels has at least three speeds for displaying the unique set of the choreography of moves and outputting the music from the electronic device.

11. The method for displaying an interactive game on an electronic device according to claim 7 further comprising the step of:
    displaying up to seventeen different active moves of the character with the plurality of appendages to make the plurality of virtual touches on the touch screen.

12. The method for displaying an interactive game on an electronic device according to claim 7 further comprising the step of:
    displaying up to four different passive moves of the character with the plurality of appendages that do not make a plurality of virtual touches on the touch screen.

13. A non-transitory computer readable storage medium for storing instructions that, when executed by a processor, cause the processor to perform a method for displaying an interactive game on an electronic device, the method comprising the steps of:
    (a) displaying a character on a touch screen interface of the electronic device;
    (b) displaying a move of the character to cause at least one appendage of the character to make a virtual touch at a location on the touch screen;
    (c) receiving a touch screen input on the touch screen;
    (d) determining if the touch screen input coincides with the location of the virtual touch of the appendage of the character on the touch screen; and
    (e) displaying a visual indication on the touch screen indicating success or failure of the touch screen input to coincide with the location of the virtual touch of the at least one appendage of the character on the touch screen.

14. The non-transitory computer readable storage medium according to claim 13 wherein step (d) further comprises the step of:
    determining if the touch screen input coincides with the location of the virtual touch of the appendage of the character on the touch screen at the same time that the character makes the virtual touch at the location on the touch screen to determine success.

15. The non-transitory computer readable storage medium according to claim 13 wherein step (b) further comprises the step of:
  displaying a choreography of moves that the character makes to make a plurality of virtual touches with a plurality of appendages at a plurality of locations on the touch screen, wherein the choreography of moves of the character emulates clapping.

16. The non-transitory computer readable storage medium according to claim 15 further comprising the step of:
  accompanying the choreography of moves with music outputted from the electronic device, wherein the beat of the music coincides with the choreography of moves of the plurality of appendages of the character.

17. The non-transitory computer readable storage medium according to claim 16 further comprising the step of:
  providing a plurality of levels of the interactive game for display on the electronic device, wherein each of the plurality of levels has a unique set of the choreography of moves, and further wherein each of the plurality of levels has at least three speeds for displaying the unique set of the choreography of moves and outputting the music from the electronic device.

18. The non-transitory computer readable storage medium according to claim 13 further comprising the step of:
  displaying up to seventeen different active moves of the character with the plurality of appendages to make the plurality of virtual touches on the touch screen.

19. The non-transitory computer readable storage medium according to claim 13 further comprising the step of:
  displaying up to four different passive moves of the character with the plurality of appendages that do not make a plurality of virtual touches on the touch screen.

20. A non-transitory computer readable storage medium for storing instructions that, when executed by a processor, cause the processor to perform a method for displaying an interactive game on an electronic device, the method comprising the steps of:
  (a) displaying on a touch screen interface of the electronic device a choreography of moves that the character makes to make a plurality of virtual touches with a plurality of appendages at a plurality of locations on the touch screen, wherein the choreography of moves of the character emulates clapping;
  (c) receiving a plurality of touch screen inputs on the touch screen;
  (d) determining if the plurality of touch screen inputs coincide with the plurality of locations of the plurality of virtual touches of the plurality of appendages of the character on the touch screen; and
  (e) displaying a visual indication on the touch screen indicating success or failure of each of the plurality of touch screen inputs to coincide with the plurality of locations of the plurality of virtual touches of the plurality of appendages of the character on the touch screen.

21. The non-transitory computer readable storage medium according to claim 20 wherein step (b) further comprises the step of:
  displaying on the touch screen a visually distinct circular area around each of the plurality of locations on the touch screen of the plurality of virtual touches of the plurality of appendages of the character.

22. The non-transitory computer readable storage medium according to claim 21 wherein step (b) further comprises the step of:
  displaying the visual indication on the touch screen indicating success by displaying each of the visually distinct circular areas in a first color, and displaying the visual indication on the touch screen indicating failure by displaying each of the visually distinct circular areas in a second color.

23. The non-transitory computer readable storage medium according to claim 20 further comprising the step of:
  accompanying the choreography of moves with music outputted from the electronic device, wherein the beat of the music coincides with the choreography of moves of the plurality of appendages of the character.

* * * * *